United States Patent Office

3,795,649
Patented Mar. 5, 1974

3,795,649
PLASTISOL PROCESS
William Peter May, North Coventry Township, Chester County, Pa., assignor to The Firestone Tire & Rubber Company, Akron, Ohio
No Drawing. Filed Feb. 14, 1972, Ser. No. 226,261
Int. Cl. C08f 45/38
U.S. Cl. 260—31.8 R       6 Claims

ABSTRACT OF THE DISCLOSURE

Vinyl chloride or a mixture thereof with copolymerizable material is polymerized in a liquid organic medium in the presence of a polymeric dispersing agent. The medium is then evaporated off and, either before, during or after the evaporation, a plasticizer is added, so as to produce a plastisol.

FIELD OF THE INVENTION

This invention relates to the production of vinyl chloride resin plastisols.

BACKGROUND OF THE INVENTION

Vinyl chloride resin plastisols, i.e., flowable dispersions of finely particulate vinyl chloride resins in liquid plasticizers, have come into wide use for coating purposes, casting, slush molding, dip molding, sheet production, etc. Such compositions have the property of gelling up upon the application of heat to form coherent, strong coatings and cast objects of plasticized vinyl chloride. The ultimate physical form and microscopic structure of the resin particle is extremely important in the formation of a practical plastisol: the dispersion of the polymers must be flowable to provide coatings, castings, etc., and this flowability must be maintained over a substantial period of time so as to fit into the channels of distribution and use—i.e., the particles must not solvate too readily upon mere standing in contact with the plasticizer. Countervailing this, the particles must solvate promptly and evenly during the heating step, and there should be very few, if any, oversize or refractory particles. The only type of process which has heretofore been found to meet these requirements in an optimum and practical way involves a quasi emulsion aqueous system in which the vinyl chloride monomer is dispersed in an aqueous medium containing hydrophile-group-containing emulsifying agents and polymerized therein by means of oil-soluble free-radical catalysts. There results a latex which is spray-dried to produce a resin which is then ground and dispersed in a liquid plasticizer to produce a plastisol. This process leaves a good deal to be desired, since it involves entrainment of the hydrophile-group-containing emulsifying agents into the final products, thereby impairing their electrical and water-resistance properties. Also the spray-drying process is rather costly, involves bulky and expensive equipment, and produces a greater or less amount of oversize and/or refractory particles due to malfunctions or hang-ups in the equipment.

Aside from the commercial plastisol art discussed above, prior art relative to the present invention disclosed hereinbelow includes various patents wherein monomers including vinyl chloride are polymerized in organic solvents which are non-solvents for the main polymeric materials to be produced, but which contain dissolved therein other polymeric materials having affinities both for the solvent and for the main polymeric materials to be produced. There results more or less stable dispersions and suspensions of the main polymeric materials to be produced. Examples of this art are shown in patents such as Osmond 3,399,164; Schmidle 3,198,759; Cousens 3,399,163; Schmidle 3,397,166; Fryd 3,405,087; and Schmidle 3,232,903. However, none of these processes appear to have been used in connection with the plastisol art.

Accordingly, it is an object of this invention to provide a novel and improved process for the manufacture of plastisols.

Another object is to provide such a process which will avoid the entrainment of hydrophile-group-containing dispersants into the final plastisol product.

A further object, in accordance with a particular variant of the invention, is to avoid the drying step in the production of plastisols.

SUMMARY OF THE INVENTION

The above and other objects are secured, in accordance with this invention, in a process in which vinyl chloride or a mixture of vinyl chloride with comonomers copolymerizable therewith, is polymerized in a volatile organic medium which is a solvent for the vinyl chloride and any comonomers but a non-solvent for the polymerization products thereof. The organic medium contains a polymeric material which has affinities both for the organic medium and for the polymerization products, and there results a fine dispersion of the polymerization products in the organic medium. The organic medium is then evaporated away from the dispersion and is replaced by a suitable plasticizer, yielding a plastisol. This evaporation and replacement may be done in any order, or simultaneously. For instance, the plasticizer may be added to the dispersion and the volatile organic medium then evaporated away, leaving the polymer dispersed in the plasticizer. As a variation, the plasticizer may be added to the dispersion during the evaporation of the solvent from the dispersion. In still another variation, the volatile medium is completely removed without addition of any plasticizer, and the dried residual polymer redispersed in the plasticizer.

The vinyl chloride and comonomers

As noted above, the invention may involve the preparation of plastisols of homopolymers of vinyl chloride or of copolymers of vinyl chloride with other ethylenically unsaturated compounds copolymerizable therewith. In general, the amount of such comonomers copolymerized with the vinyl chloride may be up to about 35%, based on the total weight of the copolymers, so that the essential character of the polyvinyl chloride chains will be preserved. Monomers which are suitable for producing copolymers with vinyl chloride are well known and include, for instance, vinyl acetate, vinyl propionate, vinyl stearate, vinylidene chloride, styrene, vinyl pyridine, acrylic and methacrylic esters such as methyl acrylate, ethyl acrylate, octyl acrylate, methyl methacrylate, ethyl methacrylate, butyl methacrylate, dodecyl methacrylate and the like, acrylonitrile, alkyl maleates, alkyl itaconates, vinyl ethers and ketones such as methyl vinyl ether, methyl vinyl ketone, methyl isopropenyl ketone and the like, etc. A more complete listing of suitable comonomers useful for polymerizing with vinyl chloride to produce latices according to this invention is found in Krczil "Kurzes Handbuch der polymerizationstechnik—II Mehrstiff—Polymerization," Edwards Bros., Inc., 1945, pp. 735–37, the item under "vinyl chloride."

The polymerization step

The general technology of polymerizing monomers in organic media containing polymeric dispersing agents is known, see the patents cited above. As applied to the present invention, the medium employed must be a solvent for vinyl chloride monomer and a non-solvent for the polymer, and should also be volatilizable, so as to facilitate removal thereof and replacement by the plasticizer. For this purpose the low-boling hydrocarbon solvents are very suitable, examples being butane, pentane, hexane, heptane, petroleum ether, benzene, toluene, and the like, and also mixtures of any two or more of these in any proportion. As to the dispersing agent, this may be any polymeric substance which (a) is soluble in the polymerization medium, i.e., contains groups which have affinity for the medium and which also (b) carries groups having affinity for the polyvinyl chloride. Such groups may be introduced into the dispersing agent in the original polymer by means of divergent groups contained in the monomer or monomers from which the dispersing agent is produced. Alternatively, the dispersing agent may be produced by polymerizing a first monomer having only a single affinity, i.e., either for the medium or for the polyvinyl chloride, but not for both. Thereafter a second monomer having a complementary affinity (for the polyvinyl chloride if the initial polymer has affinity for the medium, and vice versa) is grafted upon the initial monomer. Examples of polymeric dispersing agents suitable for use in this invention are exemplified in polymers of fatty alcohol esters of acrylic and methacrylic acid such as 2-ethylhexyl acrylate, n-decyl acrylate, n-dodecyl acrylate, n-dodecyl acrylate (lauryl acrylate), n-octadecyl acrylate (stearyl acrylate), the corresponding methacrylate esters and various copolymers of the above monomers.

It has also been found more particularly for the practice of this invention that the dispersing agent polymer should be of moderately low molecular weight, say on the order of 1,000 to 50,000. Dispersing agents in this range of molecular weights result in the best particle size and conformation in the final vinyl chloride polymer plastisol. This molecular weight adjustment may be secured by the incorporation of chain transfer agents in the original polymerization of the dispersing agent polymer, such agents being exemplified in alkyl mercaptans containing 4 to 18 carbon atoms such as n-dodecyl mercaptan, n-butyl mercaptan, n-octyl mercaptan, n-decyl mercaptan, n-dodecyl mercaptan (lauryl mercaptan), n-octadecyl mercaptan (stearyl mercaptan) and the like.

The polymerization of the vinyl chloride

This is carried out by dissolving the vinyl chloride in the medium having dissolved therein the polymeric dispersing agent and a free-radical-generating catalyst. The amount of dispersing agent will usually be on the order of 1% to 12%, based on the weight of the medium. The free-radical catalyst will usually be one which is soluble in the organic medium such as lauroyl peroxide, benzoyl peroxide, diisopropyl peroxydicarbonate, tertiary butyl peroxypivalate, acetyl cyclohexane sulfonyl peroxide, $\alpha,\alpha'$-azobis (isobutyronirtlie), $\alpha,\alpha'$-azobis ($\alpha,\gamma$ - dimethyl valeronitrile) and the like, and will be employed in an amount on the order of 0.01 to 1.0%, based on the weight of monomeric vinyl chloride present. For best results, the polymerization is carried out in stages, i.e., only a portion of the vinyl chloride is charged at the outset of the polymerization. This initial vinyl chloride polymerizes to form a "seed dispersion" in the medium. The remainder of the vinyl chloride, plus additional polymerization medium, catalysts, etc. as required is then added, and the polymerization resumed and carried to completion. The initial vinyl chloride may run, say 5 to 25% by weight of the final polymerized vinyl chloride product.

The replacement of the organic medium with plasticizer

As noted above, this step can be effected either (a) by complete evaporation of the polymerization medium, followed by pulverising and re-dispersing the vinyl chloride polymer or (b) by adding the plasticizer before and/or during the evaporation of the medium so that the dispersion in the medium gradually becomes converted to a plastisol dispersion in the plasticizer, without ever passing through a non-fluid aggregated state. The first procedure (a) is straightforward; the dispersion is subjected to conditions such as to evaporate the dispersion medium (preferably vacuum) with application of moderate heat if necessary, and of course always within the temperature tolerance of the resin. The dried resin is then pulverized in equipment which will not be subject to local overheating, for instance a hammermill, impact mill or the like. The resin is readily friable and breaks down quickly to ultrafine particles. The resultant powder is then ground with a suitable plasticizer in proportions usual in the art, e.g., 50 to 100 parts of plasticizer per 100 parts of resin. Suitable plasticizers include di(2-ethylhexyl) phthalate, butyl benzyl phthalate, dinonyl phthalate, didecyl phthalate, diisodecyl phthalate, and mixed esters of the above (such as decyl isodecyl phthalate), also, similar adipate, azelate, and sebacate esters. In some cases it may be desirable to include a greater or lesser proportion of a polymerizable plasticizer such as diallyl phthalate, diallyl maleate, triallyl isocyanurate, trimethylol propane triacrylate (or methacrylate), ethylene glycol dimethacrylate, butylene glycol dimethacrylate, and the like, where it is desired to produce a more rigid end-product.

With regard to procedure (b), this eliminates the drying and re-pulverization steps, and thus constitutes a great simplification of the overall process where the transportation, distribution and utilization situation does not impose an undue burden for freight on the plasticizer or undue duration of time between preparation and use. In this procedure the dispersion is stirred in a suitable vessel, preferably under vacuum and whatever mild heat may be required so as to effect evaporation of the polymerization medium. The desired plasticizer (any conventional plasticizer such as those listed above) is added at such a rate as to maintain the material flowable throughout the removal of the polymerization medium. Thus all, or a greater or less proportion, of the plasticizer may be added at the outset of the evaporation, and any remaining plasticizer is added as may be desired during the evaporation. Alternatively, the plasticizer may be withheld until the evaporation has begun and then added in toto, in increments, or continuously throughout the evaporation of the medium. The only requirement is that the total of polymerization medium and of plasticizer in the mass be kept up to a level such that the mass remains flowable. This will usually be the case if that total is not allowed to fall below 60%, based on the total weight of the resin. The temperature, of course, must be kept below the point at which gelation of the resin might occur.

It will be seen that this procedure (b) eliminates many problems, notably the drying out, re-powdering and re-dispersing of the resin. Solvent recovery is greatly simplified, since closed, jacketed stirred vessels with overhead takeoffs may be employed, rather than solids-drying equipment. Also the problem of refractory and oversize particles is substantially eliminated, since these generally originate from misfunctions in the drying and re-dispersing steps in conventional plastisol manufacture.

In the case of either of procedures (a) or (b) the resultant plastisol products have excellent rheological properties, which they retain over extended periods of storage. In use, they gel quickly, readily and evenly upon heating to appropriate temperature to yield strong, tough and uniformed gelled plastisol products.

With the foregoing general discussion in mind, there are given herewith detailed examples of the practice of this invention. All parts and percentages given are by weight unless otherwise expressly indicated.

Example I

| "A" emulsifier: | Grams |
| --- | --- |
| Heptane | 300 |
| Stearyl methacrylate | 300 |
| Lauroyl peroxide | 3.0 |
| n-Dodecyl mercaptan | 0.15 |

The above ingredients were charged into a 1.5 liter closeable reactor provided with a stirrer. The free space in the reactor was purged with nitrogen, the reactor was sealed, and stirring commenced and continued for 10 hours, the temperature being kept at 70° C. during this time. The reactor was then cooled to 25° C. The resultant solution contained about 50% solids and was used as described below, being referred to as "Solution A."

"B" seed dispersion:                                Grams
   Heptane _____ 180
   "Solution A" _____ 21
   Solution of diisopropyl peroxydicarbonate (20% active) _____ 4.2
   Epoxidized linseed oil ("Epoxol 9-5," a product of Swift & Co.) _____ 6.0
   Vinyl chloride _____ 300

All of the ingredients except the vinyl chloride were charged and dissolved together in a 1.5 liter closeable reactor provided with a stirrer. The free space in the reactor was then purged with nitrogen, the vinyl chloride added and the reactor closed. Stirring was commenced, the temperature adjusted to 40° C., and these conditions maintained for 15 hours. The resultant dispersion is referred to hereinafter as "Dispersion B."

"C" plastisols:                                     Grams
   Heptane _____ 160
   Solution of diisopropyl peroxydicarbonate (20% active) _____ 3.9
   Epoxidized linseed oil ("Epoxol 9-5," a product of Swift & Co.) _____ 5.4
   "Dispersion B" _____ [1] [2] 50-150
   Vinyl chloride _____ [2] 210-270
   "Solution A" _____ 18.9

[1] 30-90 grams solids per Table I.
[2] Total of 300 g.

A series of polymerization runs was carried out in accordance with foregoing recipe, varying the amount of "Dispersion B" employed as set forth hereinafter in Table I. In each run the ingredients, with the exception of the vinyl chloride, were charged into a 1.5 liter closeable stirred reactor, and the free space purged with nitrogen. The vinyl chloride was added, the reactor was closed, stirring commenced, and the temperature adjusted to 40° C., this being maintained for 15 hours. The reactor was then cooled and vented, leaving a white vinyl chloride resin dispersion containing 57-60% solids.

The dispersion was then dried in a tray in a vacuum oven at 60° C. under 1 mm. absolute pressure. The resultant polyvinyl chloride resin powder was ground in an impact grinder, yielding a fine white powdery product. This resin powder was formulated as follows:

Parts
Resin powder _____ 100
Di-(2-ethylhexyl) phthalate _____ 60

The 2 hour Brookfield viscosity (Model LVT, Spindle #4) was determined upon the resultant plastisol paste, and is recorded in Table I. Also coatings were prepared from each of the plastisols and baked at 180° C. for 3 minutes. Satisfactory coatings were obtained in each case.

TABLE I

| Run No. | Actual grams dry weight of solids dispersion | As percent of dry resin in product | Brookfield viscosity Poises | Spindle (r.p.m.) | Remarks |
|---|---|---|---|---|---|
| 1 | 30 | 10 | 315 | 12 | |
| 2 | 60 | 20 | 126 | 30 | |
| 3 | 75 | 25 | 97 | 30 | Dilatant. |
| 4 | 90 | 30 | | | Thick and dilatant. |

Example II.—Emulsifiers-varying modifier levels

"C" emulsifier solution:                            Grams
   Heptane _____ 300
   Stearyl methacrylate _____ 300
   Lauryl peroxide _____ 3.0
   n-Dodecyl mercaptan _____ [1] .15-.24

[1] Per Table II.

A series of polymerization runs was carried out in accordance with the foregoing schedule, using the procedure of Example I-A and varying the amount of mercaptan used as set forth hereinbelow in Table II. Each run was conducted in accordance with the procedure of Example I, and each of the resulting solutions, hereinafter referred to as "Solutions C," was used in the preparation of a seed dispersion as described hereinbelow.

"D" seed dispersions:                               Grams
   Heptane _____ 180
   Selected one of "Solution C" _____ [1] 21
   Solution of diisopropyl peroxydicarbonate (20% active) _____ 4.2
   Epoxidized linseed oil ("Epoxol 9-5," a product a product of Swift & Co.) _____ 6.0
   Vinyl chloride _____ 300

[1] Per Table II.

A series of runs was made in accordance with the foregoing recipe, using a different one of the several Solutions C in each of the several runs as indicated in Table I. The procedure of Example I-B was used in each run, and the resulting dispersions, hereinafter designated "Dispersions D" used as described below.

"E" plastisols:                                     Grams
   Heptane _____ 160
   Solution of diisopropyl peroxydicarbonate (20% active) _____ 3.9
   Epoxidized linseed oil ("Epoxol 9-5," a product of Swift & Co.) _____ 5.4
   Selected one of "Dispersions D" _____ [1] 100
   Vinyl chloride _____ 240
   Selected one of "Solutions C" (as per table) ___ 18.9

[1] 60 g. solids.

A series of runs was made in accordance with the foregoing schedule, using a different one of the several "Solutions D" in each of the several runs as indicated in Table II. In each run the procedure of Example I, sub-head "C" was used except that the dispersions produced were heated at 70° C. for 15 minutes before drying. Following are the properties of the plastisols produced from the dried and ground resins:

TABLE II

| | Dodecyl mercaptan used in production of the solution (C) antecedent to the Solution (D) used in this run | | 2-hour Brookfield viscosity of plastisols (Model LVT Spindle #4) | |
|---|---|---|---|---|
| Run No. | Grams | Grams/100 grams of vinyl chloride | 3 r.p.m. | 30 r.p.m. |
| 5 | .15 | .05 | 90 | 79 |
| 6 | .18 | .06 | 86 | 71 |
| 7 | .21 | .07 | 88 | 74 |
| 8 | .24 | .08 | 94 | 86 |

Example III.—Plastisol by displacement of solvent by plasticizer

"F" seed dispersion:                                Grams
   Hexane _____ 180
   "Solution A" (prepared as described in Example I-A) _____ 21
   Solution of diisopropyl peroxydicarbonate (20% active) _____ 4.2
   Epoxidized linseed oil ("Epoxol 9-5," a product of Swift & Co.) _____ 6.0
   Vinyl chloride _____ 300

A seed dispersion was prepared from the foregoing ingredients, using the procedure of Example I–B. The resultant dispersion, hereinafter referred to as "Dispersion F" was used as described below:

| "G" preparation of dispersion: | Grams |
|---|---|
| Pentane | 160 |
| Solution of diisopropyl peroxydicarbonate (20% active) | 3.9 |
| Epoxidized linseed oil ("Epoxol 9–5," a product of Swift & Co.) | 5.4 |
| "Dispersion F" | [1] 100 |
| Vinyl chloride | 240 |
| "Solution A" | 18.9 |

[1] 60 g. solids.

A dispersion was prepared from the above ingredients, using the procedure of Example I, sub-head C. The resultant dispersion, hereinafter referred to as "Dispersion G" was used in the preparation of a plastisol as described below:

| "H" plastisol: | Grams |
|---|---|
| "Dispersion G" | 170 |
| Di-(2-ethylhexyl) phthalate | 60 |

A stripping vessel having a mechanical stirrer, vacuum offtake and dropping funnel was provided for this run. The "Dispersion G" was charged into the stripping vessel and the di-(2-ethylhexyl) phthalate into the dropping funnel. Stirring was commenced, a vacuum of 10 mm. absolute applied and the dioctyl phthalate admitted through the dropping funnel to keep the liquid level constant as the pentane and hexane distilled off. Due to the rapid evaporation of the solvents the stripping vessel is cooled significantly and heat must be supplied (in this case by an electric heating mantle) in order to maintain room temperature (25° C.) and continued distillation. The addition of the di-(2-ethylhexyl) phthalate was completed in approximately 3.5 hours, after which the vacuum and stirring were maintained for an additional hour. The resulting paste was 98.5% non-volatile, and had an initial Brookfield viscosity (LVT, Spindle #4, 30 r.p.m.) of 136 poises.

A sample of the paste was coated upon a sheet steel substrate to a depth of .05 inch, and stoved at 350° F. for 3 minutes. A smooth, tough, transparent coating resulted.

Example IV.—Large scale preparation

| "A" emulsifier: | Pounds | |
|---|---|---|
| Heptane | 130.0 | (59 kg.). |
| Stearyl methacrylate | 130.0 | (59 kg.). |
| Lauroyl peroxide | 1.3 | (590 g.). |
| n-Dodecyl mercaptan | 0.009 | (41 g.). |

The above ingredients were charged into a 50 gallon (190 liter) closeable reactor provided with a stirrer. The free space in the reactor was purged with nitrogen, the reactor was sealed, and stirring commenced and continued for 10 hours, the temperature being kept at 70° C. during this time. The reactor was then cooled to 25° C. The resultant solution contained about 50% solids and was used as described below, being referred to as "Solution A."

| "B" seed dispersion: | Pounds | |
|---|---|---|
| Heptane | 90.0 | (41 kg.). |
| "Solution A" | 10.5 | (4.8 kg.). |
| Diisopropyl peroxydicarbonate | 0.36 | (164 g.). |
| Epoxidized linseed oil ("Epoxol 9–5," a product of Swift & Co.) | 3.0 | (1.4 kg.). |
| Vinyl chloride | 150.0 | (68 kg.). |

All the ingredients except the vinyl chloride were charged and dissolved together in a 50 gallon (190 liter) closeable reactor provided with a stirrer. The free space in the reactor was then purged with nitrogen, the vinyl chloride added and the reactor closed. Stirring was commenced, the temperature adjusted to 40° C., and these conditions maintained for 15 hours. The resultant dispersion is referred to hereafter as "Dispersion B."

| "C" plastisol resin: | Pounds | |
|---|---|---|
| Heptane | 90.0 | (41 kg.). |
| Diisopropyl peroxydicarbonate | 0.3 | (136 g.). |
| Epoxidized linseed oil | 2.4 | (1.1 kg.). |
| "Dispersion B" | 50.0 | (22.8 kg.). |
| "Solution A" | 8.4 | (3.8 kg.). |
| Vinyl chloride | 120.0 | (54.5 kg.). |

The ingredients, with the exception of the vinyl chloride, were charged into a 50 gallon (190 liter) closeable stirred reactor and the free space purged with nitrogen. After adding the vinyl chloride the reactor was closed, stirring commenced, and the temperature adjusted to 40° C.

After 15 hours the temperature was increased to 75° C. for 10 minutes. The reactor was then cooled and vented to give a white dispersion at 57–60% solids. A paste made from dry resin with 60 phr. di-(2-ethylhexyl) phthalate had a two hour Brookfield viscosity of 84/74 poises (Model LVT, Spindle #4, 3/30 r.p.m.).

EXAMPLE V.—Plastisol film

A paste was made using the resin from Example IV using the following standard formulation:

| | Parts |
|---|---|
| Resin | 100 |
| Di-(2-ethylhexyl)phthalate | 60 |

The paste was cast on a metal plate at a thickness of 6–8 mils and baked in an oven at 177° C. (350° F.) for 2.25 minutes. A weighed 2" x 1" piece of free film was then suspended in water at a temperature of 110° F. for 72 hours. The water pick-up and contrast ratio data given in Table III below illustrate the greatly reduced water sensitivity of this film when compared to a similar film made from a conventional plastisol resin.

TABLE III

| | Percent water pickup [1] (72 hours) | Contrast ratio [2] (72 hours) |
|---|---|---|
| NAE plastisol film | 0.13 | 4.0 |
| Conventional plastisol film | 2.5–3.0 | 40–45 |

[1] Water pickup is run by immersing a weighed 2" x 1" piece of film in water at a temperature of 110° F. for 72 hours. The surface is wiped dry and the film re-weighed. The figure is reported as a percentage increase in weight.

[2] This test is run on a film which has received a water immersion treatment as in (1) above. Using a gloss meter (Model 610 manufactured by Photovolt Corp.) reflectance values are obtained on light which has been shined through the film at an angle of 60° and reflected off black and white backgrounds in separate runs. The ratio of the value obtained when using a black background over that obtained when using a white background gives the contrast ratio. The magnitude of this value is an indication of the extent to which a film "blushes" or becomes cloudy when immersed in warm water.

EXAMPLE VI.—Recipe using alkyl vinyl ether suspending agent

| | Parts by weight |
|---|---|
| Vinyl chloride | 100.0 |
| Lauroyl peroxide | 1.1 |
| Diisopropyl peroxydicarbonate | 0.1 |
| Gantrez B–653 [1] | 7.0 |
| Odorless mineral spirits | 90.0 |

[1] Gantrez B–653 is the trade name for a polyvinyl isobutyl ether resin manufactured by GAF Corporation.

The above ingredients are charged into a polymerization vessel and polymerized at 50° C. for 24 hours. The resultant dispersion, when dried and re-dispersed in plasticizer as in Example I–C, and also when the mineral spirits therein are displaced by distillation with plasticizer as in Example III–H, results in smooth plastisol dispersions.

What is claimed is:

1. Process of preparing a vinyl chloride resin plastisol, wherein
a monomeric material selected from the group consisting of vinyl chloride and mixtures of vinyl chloride with up to 25% of other ethylenically unsaturated monomers copolymerizable therewith is polymerized in a low-boiling hydrocarbon solvent which is a non-solvent for vinyl chloride polymers said low-boiling hydrocarbon solvent having dissolved therein from 1 to 12%, based on the weight of low boiling hydrocarbon solvent, of a polymeric dispersing agent having a molecular weight of 1000–50,000 selected from the group consisting of fatty alcohol esters of acrylic and methacrylic acids in the presence of from 0.1 to 1.0%, based on the weight of vinyl chloride present, of a free-radical generating catalyst soluble in said low-boiling hydrocarbon solvent to produce a dispersion of a vinyl chloride resin in said low-boiling hydrocarbon solvent, said low-boiling hydrocarbon solvent is removed from said dispersion and from 50 to 100 parts of a liquid plasticizer for vinyl chloride resins, based on 100 parts by weight of said vinyl chloride resin, is added to said vinyl chloride resin to form a plastisol of said vinyl chloride resin in said liquid plasticizer, which plastisol dispersion remains readily flowable for long periods of time and has the property of gelling, upon application of heat, to form coherent, strong coatings and cast objects of plasticized vinyl chloride resin.

2. Process according to claim 1, wherein the low boiling hydrocarbon solven is removed from said dispersion by evaporation, the polymer (P) is thereafter ground to a fine powder, and the powder is thereafter dispersed in a plasticizer to yield a plastisol.

3. Process according to claim 2, wherein said monomeric material is vinyl chloride.

4. Process according to claim 1, wherein the low boiling hydrocarbon solvent is removed from said dispersion by evaporation, and a plasticizer is added to the dispersion before completion of the evaporation, thereby directly yielding a plastisol.

5. Process according to claim 4, wherein said monomeric material is vinyl chloride.

6. Process according to claim 1, wherein the plasticizer is selected from the group consisting of di(2-ethylhexyl) phthalate, butyl benzyl phthalate, dinonyl phthalate, didecyl phthalate, diisodecyl phthalate, mixed esters of the foregoing phthalates, and the corresponding adipate, azelate and sebacate esters.

References Cited
UNITED STATES PATENTS

| | | | |
|---|---|---|---|
| 2,899,405 | 8/1959 | Cooper, Jr. | 260—884 |
| 3,166,524 | 1/1965 | Schmidle et al. | 260—884 |
| 2,618,621 | 11/1952 | Burt | 260—884 |

MURRAY TILLMAN, Primary Examiner

J. ZIEGLER, Assistant Examiner

U.S. Cl. X.R.

23.5 R, 31.8 K, 33.6 UA, 884, 885

UNITED STATES PATENT OFFICE
CERTIFICATE OF CORRECTION

PO-1050
(5/69)

Patent No. 3,795,649          Dated March 5, 1974

Inventor(s) William Peter May

It is certified that error appears in the above-identified patent and that said Letters Patent are hereby corrected as shown below:

In Column 2, Line 65, "chloride" should read --chlorid--.

In Column 3, Line 3, "boling" should read --boiling--.

In Column 3, Line 24, "n-dodecyl acrylate" should be deleted one occurrence (it appears twice).

In Column 3, Line 53, "(isobutyronirtlie)" should be --(isobutyronitrile)--.

In Column 4, Line 25, "simiplification" should be --simplification--.

In Column 4, Line 40, the words "in toto" should be underlined.

In Column 5, Line 28, the parentheses should be closed after the word "active".

In Column 5, Line 38, insert the word --the-- after the word "with".

In Column 5, Line 70, Table I, insert the word --in-- after the word "solids".

In Column 7, Line 14, the quotation marks are inverted.

In Column 7, Line 47, delete the period after "Example IV".

In Column 8, Line 22, "phr." should read --PHR--.

In Column 8, Line 41, "Tabte" should read --Table--.

In Column 9, Line 10, insert a hyphen after the word "low".

In Column 10, Line 2, "solven" should read --solvent--.

Signed and sealed this 19th day of November 1974.

(SEAL)
Attest:

McCOY M. GIBSON JR.
Attesting Officer

C. MARSHALL DANN
Commissioner of Patents